United States Patent
Bender

(10) Patent No.: US 11,770,194 B2
(45) Date of Patent: Sep. 26, 2023

(54) APPARATUS FOR A SINGLE EDGE NIBBLE TRANSMISSION (SENT) MULTI TRANSMISSION MODE

(71) Applicant: Renesas Electronics America Inc., Milpitas, CA (US)

(72) Inventor: Steffen Bender, Dresden (DE)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 17/509,469

(22) Filed: Oct. 25, 2021

(65) Prior Publication Data

US 2023/0129498 A1  Apr. 27, 2023

(51) Int. Cl.
*H04B 14/02* (2006.01)
*H04L 25/49* (2006.01)
*H04L 12/40* (2006.01)
*H04L 1/00* (2006.01)

(52) U.S. Cl.
CPC ......... *H04B 14/026* (2013.01); *H04L 1/0061* (2013.01); *H04L 12/40* (2013.01); *H04L 25/4902* (2013.01); *H04L 2012/40273* (2013.01)

(58) Field of Classification Search
CPC ..... H04B 14/026; H04L 1/0061; H04L 12/40; H04L 25/4902; H04L 2012/40273
USPC ........................................................ 375/239
See application file for complete search history.

(56) References Cited

U.S. PATENT DOCUMENTS

| | | | |
|---|---|---|---|
| 2015/0236876 A1* | 8/2015 | Cadugan ................. | H04L 7/042 375/242 |
| 2015/0269019 A1* | 9/2015 | Scherr .................... | H03M 13/09 714/807 |
| 2018/0067153 A1* | 3/2018 | Kolof ..................... | G01R 23/06 |
| 2019/0199451 A1* | 6/2019 | Krall .................... | H04B 14/026 |
| 2020/0244481 A1* | 7/2020 | Scherr ............... | H04L 12/40019 |

* cited by examiner

*Primary Examiner* — Kevin M Burd
(74) *Attorney, Agent, or Firm* — Chao Wei Chung

(57) ABSTRACT

Methods, systems, and apparatuses for a single edge nibble transmission (SENT) multi-transmission mode are described. In an example, a system can include a transmitter and a receiver connected to one another. The transmitter may encode an identifier of a device in a synchronization nibble of a SENT signal. The transmitter may transmit the SENT signal with the encoded identifier to the receiver. The receiver may receive the SENT signal from the transmitter. The receiver may decode the identifier of the device from the synchronization nibble of the SENT signal to identify the device.

20 Claims, 5 Drawing Sheets

APPARATUS FOR A SINGLE EDGE NIBBLE TRANSMISSION (SENT) MULTI TRANSMISSION MODE

BACKGROUND

The present disclosure relates to apparatuses and methods for sensors utilizing the single edge nibble transmission (SENT) protocol, and more specifically, relates to a multi-transmission mode that allows multiple sensors to connect and communicate to one receiver.

Sensors can be used to provide feedback information in various types of systems. In some examples, the sensors can operate as standalone sensors that are connected to an electronic control unit (ECU) through a sensor interface. An example interface that can be used for the sensors to transmit data to the ECU can utilize the single edge nibble transmission (SENT) digital communication protocol SENT protocol (also known as SAE J2716). The SENT protocol is a unidirectional point-to-point connection that allows the sensors to transmit data to the ECU. Data transmission using the SENT protocol is a serial data transmission, and specific hardware units are needed in the ECU for interpreting and decoding the data being transmitted. The SENT protocol can be limited to one hardware unit per sensor. Thus, to connect an additional sensor to an ECU, an available SENT port on the ECU, and additional hardware unit for each additional sensor, are needed. These additional ports and hardware units can be costly and can occupy additional space in the ECU.

SUMMARY

In some examples, an apparatus for operating a multi-transmission mode of a single edge nibble transmission (SENT) protocol is generally described. The apparatus can include a controller. The controller can be configured to encode an identifier of a device in a synchronization nibble of a SENT signal.

In some examples, an apparatus for operating a multi-transmission mode of a SENT protocol is generally described. The apparatus can include a controller. The controller can be configured to receive a SENT signal. The controller can be further configured to decode an identifier of a device from a synchronization nibble of the received SENT signal to identify the device.

In some examples, a system configured to implement a multi-transmission mode of a SENT protocol is generally described. The system can include a receiver and a transmitter connected to one another. The transmitter can be configured to encode an identifier of a device in a synchronization nibble of a SENT signal. The transmitter can be further configured to transmit the SENT signal with the encoded identifier to the receiver. The receiver can be configured to receive the SENT signal transmitted from the transmitter. The receiver can be further configured to decode the identifier of the device from the synchronization nibble of the SENT signal to identify the device.

Further features as well as the structure and operation of various embodiments are described in detail below with reference to the accompanying drawings. In the drawings, like reference numbers indicate identical or functionally similar elements.

DETAILED DESCRIPTION

Figure 1:
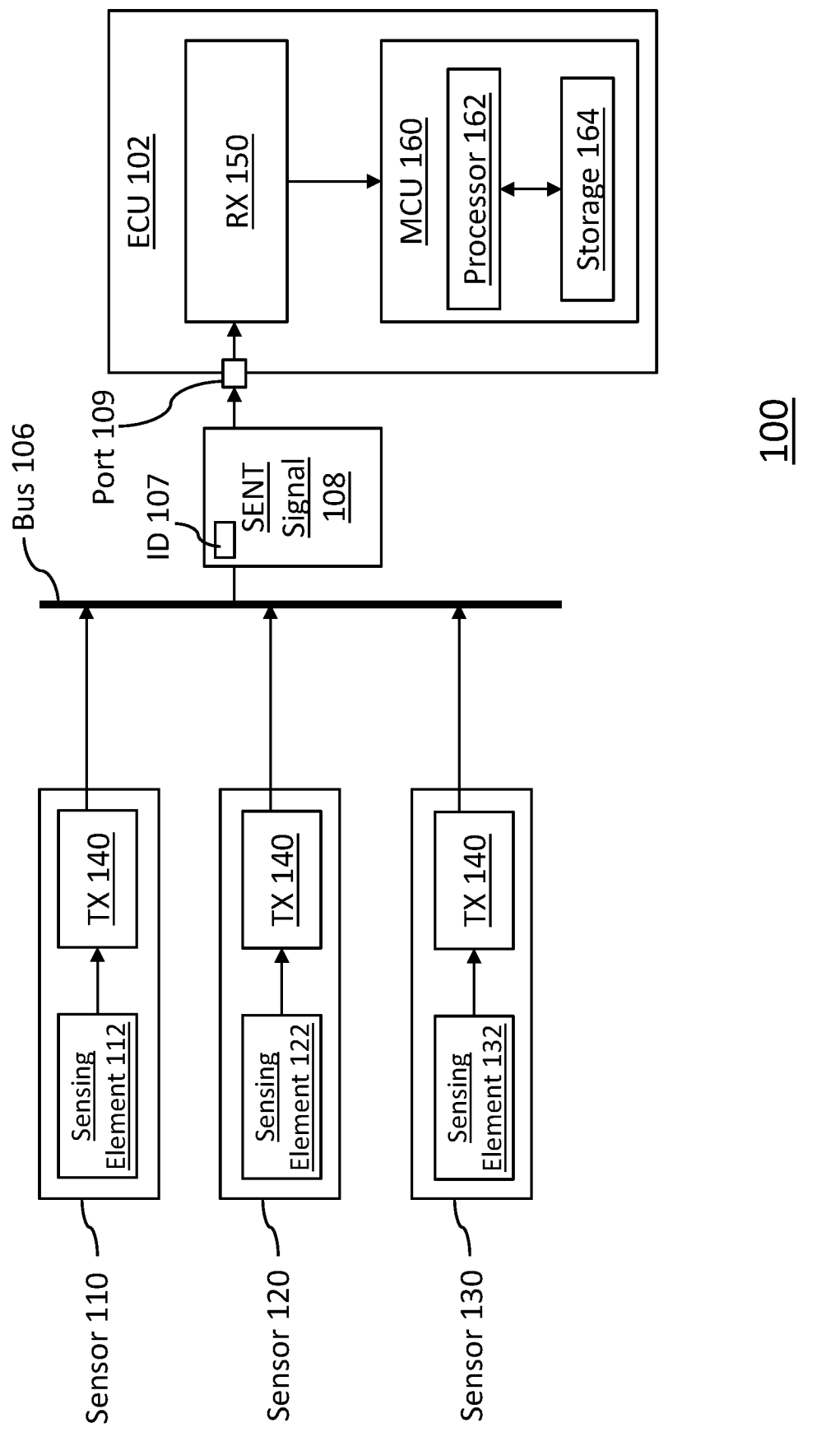
FIG. 1 is a diagram showing an example system that can implement multi-transmission mode in single edge nibble transmission (SENT) in one embodiment.

FIG. 1 is a diagram showing an example system 100 that can implement multi-transmission mode in single edge nibble transmission (SENT) in one embodiment. The system 100 can be a vehicular sensor system in a vehicle. The system 100 can include an electronic control unit (ECU) 102, communication bus or sensor bus (or sensor interface) 106, and one or more sensors, such as sensors 110, 120, 130. Although three sensors are shown in the example of FIG. 1, it will be apparent to a person or ordinary skill in the art that the system 100 can be implemented for an arbitrary number of sensors and/or based on a desired implementation and/or performance of the system 100. The ECU 102 can be a computer device connected to one or more parts of a vehicle, such as motors, engines, transmissions, user interfaces (e.g., car infotainment systems), control mechanisms such as buttons, and/or other parts of the vehicle that can be controlled by the ECU 102. The ECU 102 can be connected to the sensors 110, 120, 130 via the sensor bus 106, and can receive data from the sensors 110, 120, 130 via the sensor bus 106.

Each sensor among the sensors 110, 120, and 130 can include a transmission (TX) module 140. The TX module 140 can be an apparatus that can operate as a single edge nibble transmission (SENT) transmission interface or module configured to output a SENT signal 108 (e.g., a signal having a format defined by the SENT protocol). Further, the sensors 110, 120, and 130 can include sensing elements 112, 122, 132, respectively. The sensing elements 112, 122, 132 can include, but are not limited to, pressure sensors, temperature sensors, air flow sensors, accelerometers, speed sensors, infrared sensors, and/or other types of sensors that can sense various parameters (e.g., physical parameters) of an environment surrounding or within a vehicle implementing the system 100. Each one of the sensing elements 112, 122, 132 can be connected to the TX module 140 in its corresponding sensor. The parameters being sensed by the sensing elements 112, 122, 132 can be provided to the TX module 140, and the TX module 140 (or a controller in the TX module 140) can convert the sensed parameters into a SENT signal.

The ECU 102 can include a receiver (RX) module 150 and a microcontroller unit (MCU) 160. The MCU 160 can include processing components, such as a processor 162, and storage elements 164 such as a memory device or a cache memory of the processor. The storage elements 164 can be configured to store instructions, such as executable code, that can be executable by the processor 162 to perform one or more of the embodiments being described in accordance with the present disclosure. The RX module 150 can be an apparatus that can operate as a SENT receiver interface or module configured to receive SENT signals from the TX modules 140 of the sensors 110, 120, 130, via the sensor bus 106. The RX module 150 (or a controller of the RX module 150) can be configured to interpret and decode data and messages encoded in the SENT signal 108, and may convert the decoded data into digital signals having a format that can be processed by the processor 162 of the MCU 160. The processor 162 of the MCU 160 can use the digital signals provided by the RX module 150 to generate control signals that can control and/or operate various parts (e.g., various parts of a vehicle) connected to the ECU 102.

The TX module 140 in the sensors 110, 120, 130, and the RX module 150 in the ECU 102, can facilitate data transmission in one direction—from the sensors 110, 120, 130 to the ECU 102, using the SENT protocol. The SENT protocol is unidirectional, and is an asynchronous voltage interface. Transmission of SENT signals can be performed using three wires: 1) a signal line (low state<0.5V, high state>4.1V), 2) a supply voltage line (5V), and 3) a ground line, where these three wires can be in the sensor bus 106. The TX module 140 and the RX module 150 can be configured to facilitate transmission of SENT signals, such as a SENT signal 108, from the sensors 110, 120, 130, to the ECU 102 using one port 109 on the ECU 102. The port 109 can be connected to the RX module 150. In order to use one port (e.g., port 109) to receive SENT signals from more than one sensors (e.g., sensors 110, 120, 130), an identifier (ID) 107 can be encoded or coded in the SENT signal 108, where the ID 107 identifies the sensor that transmitted the SENT signal 108. The TX module 140 of each sensor among the sensors 110, 120, 130 can be configured to encode a respective ID in a corresponding SENT message. For example, if the sensor 110 is the sensor transmitting the SENT signal 108, the TX module 140 of the sensor 110 can encode the ID 107 of the sensor 110 in the SENT signal 108.

Figure 2:
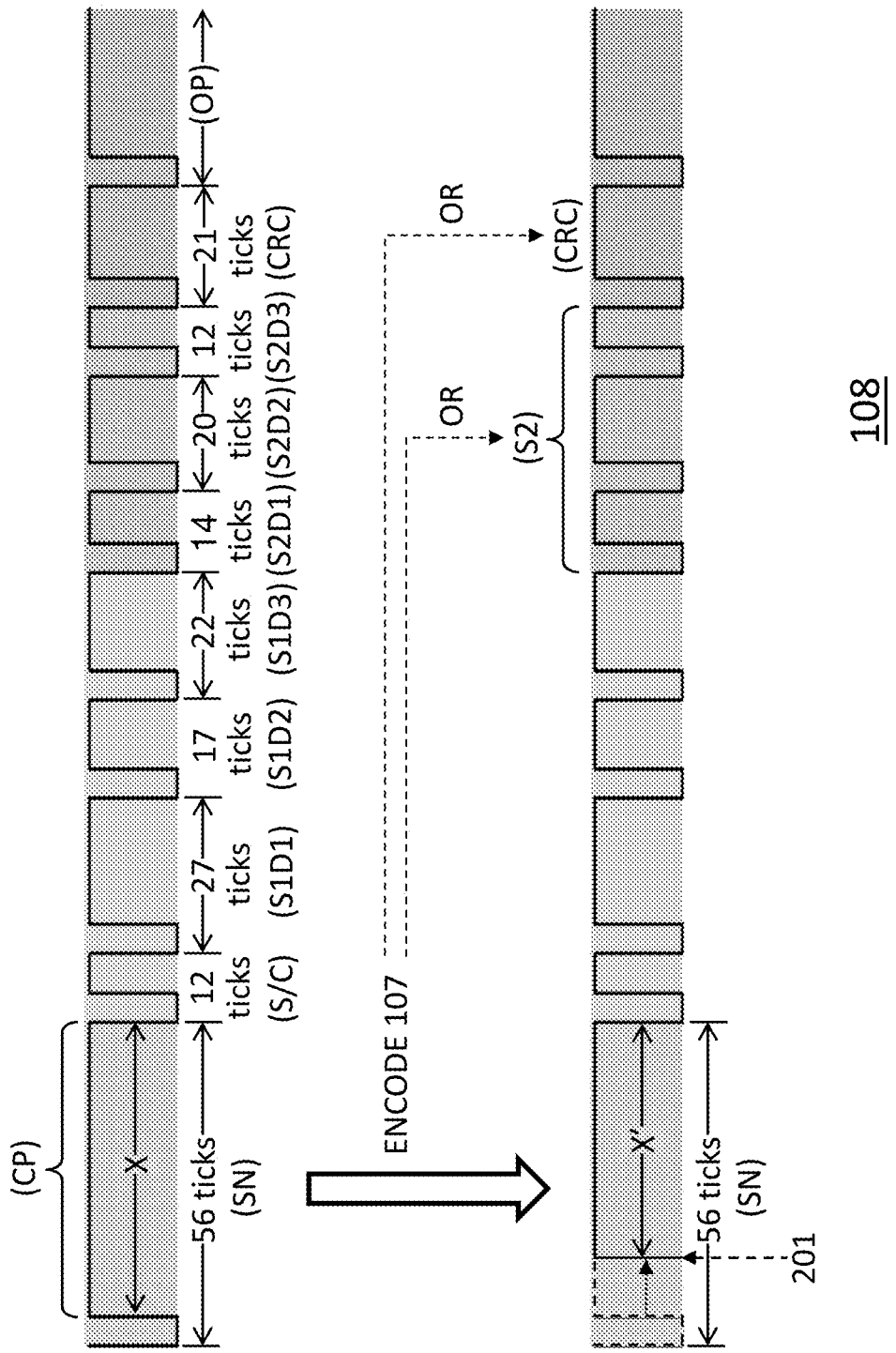
FIG. 2 is a diagram showing an example SENT signal that can implement multi-transmission mode in single edge nibble transmission (SENT) in one embodiment.

FIG. 2 is a diagram showing an example message frame of a SENT signal 108 that can implement multi-transmission mode in single edge nibble transmission (SENT) in one embodiment. Note that the message frame of the SENT signal 108 shown in FIG. 2 is an example for explanation purposes. A message frame of a SENT signal 108 can have a fast channel format or slow channel format, and each one of the fast channel format and the slow channel format can have multiple message frame formats. It will be apparent to a person of ordinary skill in the art that the embodiments described herein can be applied to any format of a SENT signal 108.

The basic unit of time for the SENT protocol is referred to as a tick, where the duration of a tick can be variable between, for example, 3 microseconds (μs) to 90 μs. In an example, the duration of a tick can be defined by dividing a clock cycle (e.g., 4-megahertz (MHz) clock) by a tick parameter defined for the system 100. A minimum data unit is referred to as a nibble. A nibble is 4 bits of data encoded using pulse width modulation (PWM), and encoded in a combined pulse timing of an initial fixed-width low period followed by a variable-width high period. In an example message frame shown in FIG. 2, each nibble in the SENT signal 108 can begin with a logic zero (logic low) for a fixed width of, for example, 5 ticks or more, then followed by a logic one (logic high) with a variable duration. Thus, a duration of a nibble can be a sum of the fixed logic zero duration and the variable logic one duration, causing the duration of the nibble to be variable within, for example, a data nibble (e.g., S1D1, S1D2 . . . S2D3) can have 12 to 27 ticks (e.g., representing nibble value of 0 to 15, or binary 0000 to 1111). Other nibbles, such as a status or communication nibble, a cyclic redundancy check (CRC) nibble, etc., can have variable tick count or duration to represent different information.

A message frame of a SENT signal begins with a synchronization nibble (SN) that includes a calibration pulse (CP), where the synchronization nibble can be used by a receiver (e.g., the RX module 150 shown in FIG. 1) to measure a tick timing of the transmission. For example, the synchronization nibble has a unit duration of 56 ticks, such that the receiver can divide a time duration of the synchronization nibble by 56 to obtain the tick timing unit. A status or communication nibble (S/C) can follow the synchronization nibble in the message frame. The status or communication nibble can be a first nibble after the synchronization nibble, and can communicate status and/or slow channel data bits depending on the SENT format being used for the system 100. The message frame can end with a CRC or checksum nibble and sometimes an optional pause pulse (OP). The optional pause pulse can be variable, and can be used to maintain a uniform tick count. Therefore, as shown in the example of FIG. 2, the message frame of a SENT signal can span from the synchronization nibble to the CRC or the OP nibble.

In the example shown in FIG. 2, the SENT signal 108 can carry two 12-bit data words. The first 12-bit word includes the nibbles S1D1, S1D2, and S1D3, where each one of these nibbles encodes 4 bits of data. The nibble S1D1 can have 27 ticks, representing 4-bit data of 1111, or value of 15. The nibble S1D2 can have 17 ticks, representing 4-bit data of 0101, or value of 5. The nibble S1D3 can have 22 ticks, representing 4-bit data of 1010, or value of 10. The second 12-bit word includes the nibbles S2D1, S2D2, and S2D3, where each one of these nibbles encodes 4 bits of data. The nibble S2D1 can have 14 ticks, representing 4-bit data of 0010, or value of 2. The nibble S2D2 can have 20 ticks, representing a 4-bit data of 1000, or value of 8. The nibble S2D3 can have 12 ticks, representing a 4-bit data of 0000, or value of 0. Note that the SENT signal 108 shown in FIG. 2 is an example for explanation purposes. It will be apparent to a person of ordinary skill in the art to realize that the SENT signal 108 can carry data words of various different lengths, such as a 16-bit word and a 8-bit word, etc.

As mentioned above, in order to use one port (e.g., port 109 shown in FIG. 1) to receive SENT signals from more than one sensors (e.g., sensors 110, 120, 130 shown in FIG. 1), the identifier (ID) 107 can be encoded in the SENT signal 108, where the ID 107 identifies the sensor that transmitted the SENT signal 108. The TX module 140 (shown in FIG. 1), or a controller of the TX module 140, of each sensor among the sensors 110, 120, 130 can be configured to encode the ID 107 in the SENT message 108. In an example embodiment shown in FIG. 2, the ID 107 can be encoded in the synchronization nibble SN of the SENT signal 108. To encode the ID 107, the TX module 140, or a controller of the TX module 140, can set a tick position 201 to start a transition from logic zero (or logic low) to logic one (logic high) in the synchronization nibble SN to start the calibration pulse (CP). For example, prior to encoding the ID 107, the calibration pulse (CP) can have a logic high signal spanning X ticks (e.g., X can be 51 if the fixed logic low to start all nibbles in the SENT signal 108 is 5 ticks). In response to the TX module 140 encoding the ID 107 into the calibration pulse (CP), the calibration pulse (CP) with the encoded ID 107 can have a logic high signal spanning X' ticks, where X' is less than X. The tick position 201, or the width of the calibration pulse (CP), which is X' in the example, in the synchronization nibble after the encoding is performed, can represent the ID 107. The RX module 150, shown in FIG. 1, can receive the SENT signal 108 from the TX module 140 via the sensor bus 106. The RX module 150 can be configured to decode the ID 107 from the synchronization nibble of the received SENT signal 108.

In one embodiment, the identifier (ID) 107 can be encoded in other nibbles of the SENT signal 108. For example, the ID 107 can be encoded in the CRC nibble instead of the synchronization nibble. In another example, the ID 107 can be encoded in one of the 12-bit words that may be unused (e.g., not encoded with any data). For example, if the second 12-bit word is not being used, then the ID 107 can be encoded in one or more of the nibbles S2D1, S2D2, and S2D3 of the second 12-bit word. By encoding the ID 107 in one or more of the nibbles (e.g., synchronization nibble, CRC nibble, and/or data nibbles), the SENT signal 108 can include an identification of the sensor that transmitted the SENT signal 108. In an example, encoding of the ID 107 in the CRC nibble or a data nibble can include defining a number of ticks in the nibble. For example, a CRC nibble having 12 ticks can representing a 4-bit word of 0000, or an ID #0, and a CRC nibble having 15 ticks can representing a 4-bit word of 0011, or an ID #3.

In another example, the ID 107 can be encoded in more than one nibble in order for the RX module 150 to check the received decoded ID for correctness. For example, the ID 107 can be encoded in both the synchronization nibble and the CRC nibble, such that the processor 162 of the MCU 160 can compare both encoded copies of the ID 107 to validate a correctness of the ID 107. If the two encoded copies of the ID 107 do not match, then the processor 162 can determine that there can be an anomaly, such as error in operations of the sensor having the ID 107, or potential security issue (e.g., man-in-the-middle attacks, etc.).

In an example, to decode the ID 107, the RX module 150 can identify the tick position 201 in the synchronization nibble to determine the tick position where the transition from logic low state to logic high state of the calibration pulse (CP) begins. The RX module 150 can provide the identified tick position 201 to the MCU 160, where the storage elements 164 can stored correspondences between sensor IDs and tick positions. For example, the tick position 201 can be assigned to the sensor 110, and another tick position can be assigned to the sensor 120. Therefore, the MCU 160 can use the tick position 201 decoded by the RX module 150 to identify the sensor that sent the SENT signal 108.

In another example, to decode the ID 107, the RX module 150 can determine a tick count of the calibration pulse (CP) in the SENT signal 108. For example, the RX module 150 can determine a first time stamp where the logic high state of the calibration pulse (CP) begins (or where the low-to-high transition occurs), and a second time stamp where the logic high state of the calibration pulse (CP) ends (or where the high-to-low transition occurs). The RX module 150 can determine a difference between the first and second time stamps, and divide the time difference by the tick unit of the SENT message (e.g., that can be obtained by dividing the total time duration of the synchronization nibble by 56) to obtain a tick count of the calibration pulse (CP). The tick count of the calibration pulse (CP) can represent the ID 107. The RX module 150 can provide the tick count of the high logic state to the MCU 160, where the storage elements 164 can store correspondences between sensor IDs and tick counts. For example, the tick count X' can be assigned to the sensor 110, and another tick count X can be assigned to the sensor 120. Therefore, the MCU 160 can use either the tick position in which the calibration pulse (CP) begins (e.g., tick position 201), or the tick count of the calibration pulse (CP) (e.g., X'), to identify the sensor that sent the SENT signal 108.

Note that the example SENT signal 108 shown in FIG. 2 is a SENT signal having a fast channel format (e.g., being transmitted with the option to simultaneously send secondary data in the slow channel). Other formats of a SENT signal can include the fast channel formats: 12-bit single secure message and fast channel high speed; and slow channel formats: short serial message format for 8-bit messages and enhanced serial message format for either 12-bit or 16-bit messages. The fast channel format of 12-bit single secure message can transmit one 12-bit data message, an 8-bit incremental counter, and the inverse of the most significant data nibble. The fast channel high speed format can transmit 12 bits of data in four nibbles, and is unique in that for the four bits encoded in the nibble width, the most significant bit is always logic 0, thus only the three least significant bits are the transmitted data . Slow channel formats typically limits data to be sent only two bits at a time, so for each fast channel message frame. The two bits of slow channel data can be contained in bit 3 and bit 2 of the status nibble. The slow channel format is referred to as a "slow" message because it takes multiple fast channel message frames to complete the transmission of a single value via the slow channel data conveyed in the status nibble of the fast channel data frames. For example, it takes 16 fast channel data frames to transmit 8 bits of slow channel data. However, the slow channel transmission allows continuous monitoring of information such as temperature, diagnostics and production codes, which typically do not change or may change at a slower rate than the physical parameters being sensed by the sensors. It will be apparent to a person of ordinary skill in the art that the embodiments described herein can be applied to any format of a SENT signal.

Figure 3:
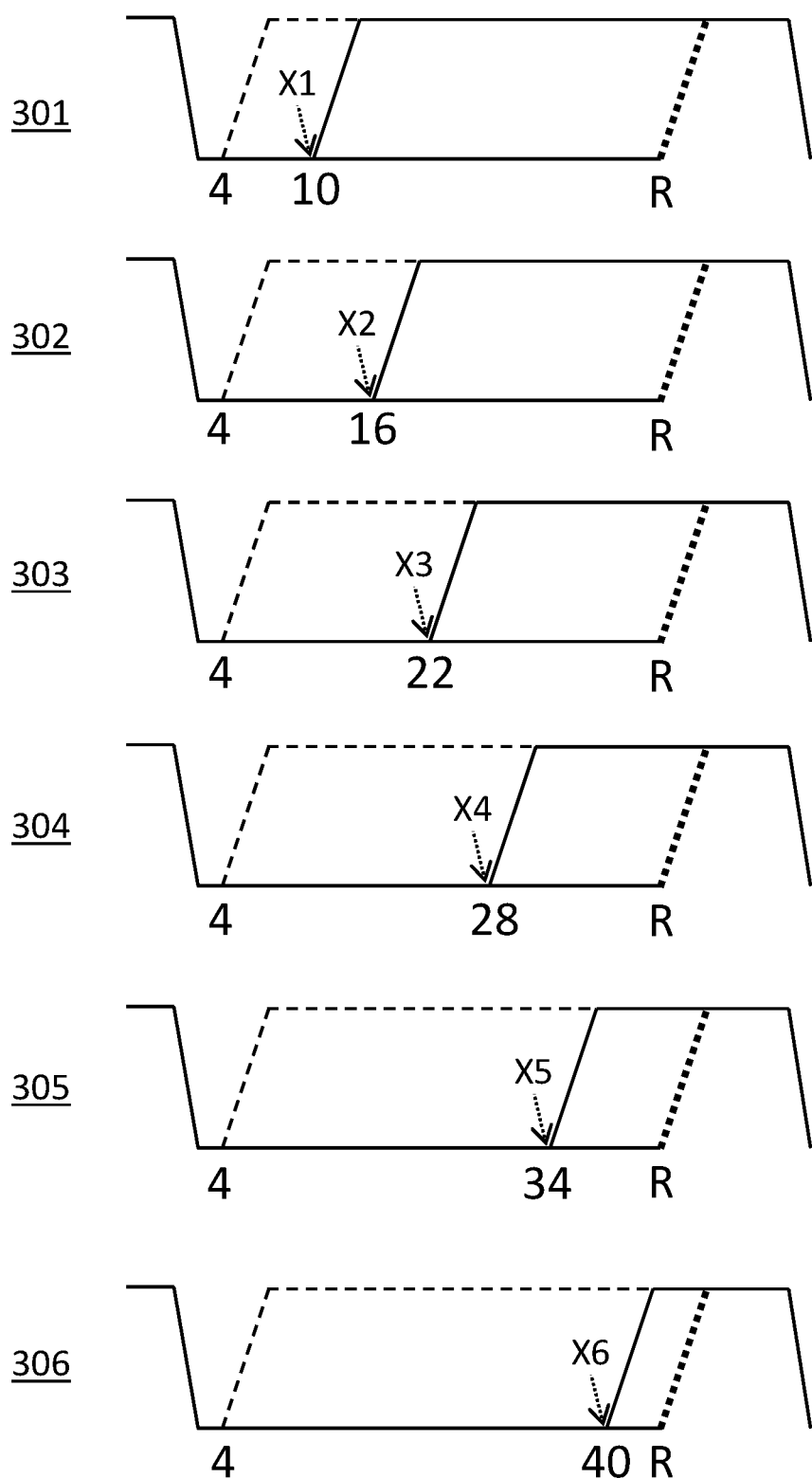
FIG. 3 is a diagram showing different sensor identifiers that can be encoded in a SENT signal in one embodiment.

FIG. 3 is a diagram showing different sensor identifiers that can be encoded in a SENT signal in one embodiment. In the example shown in FIG. 3, six different sensors can be connected to the port 109 of the ECU 102 shown in FIG. 1. The synchronization nibbles and corresponding calibration pulses (CP) of these six sensors are shown in FIG. 3, and labeled as synchronization nibbles 301, 302, 303, 304, 305, 306. Each synchronization nibble among the synchronization nibbles 301, 302, 303, 304, 305, 306 can have a tick count of 56 ticks (from tick position 0 to tick position 55). The first five ticks, from tick position 0 to 4, is a fixed tick count for a logic low state prior to starting the calibration pulse (CP). The calibration pulse (CP) can start at the tick count where a low-to-high transition occurs. A tick position R at a tick position 46 can denote a reset that can be used by the ECU 102 to request a reset to the system and to request a reset of an initialization process (described below with respect to FIG. 4).

Each pulse shown in FIG. 3 is encoded with a respective ID for a corresponding sensor. For example, a first sensor can transmit a SENT message that includes the synchronization nibble 301 with an encoded ID of X1, where X1 can be defined by the tick position (e.g., tick position 10) where a low-to-high transition occurs to start the transmission of the pulse 301. A second sensor can transmit a SENT message that includes the synchronization nibble 302 with an encoded ID of X2, where X2 can be defined by the tick position (e.g., tick position 16) where a low-to-high transition occurs to start transmission of the pulse 302. The example shown in FIG. 3 can utilize the tick positions 10, 16, 22, 28, 34, 40 to decode the six different IDs of the six different sensors. Other tick positions are possible, such as, for example, 16, 22, 28, 34, 40, 46 (with R being defined at another tick position), or 5, 11, 17, 23, 29, 35, 41, etc. The tick position for encoding an ID is assigned to each sensor prior to normal operations. Upon being assigned to a specific tick position, each sensor can encode its ID at the assigned tick position for each SENT signal being transmitted to the ECU 102.

The example presented in FIG. 3 utilizes tick positions that are 6 ticks apart from one another to encode multiple sensor IDs. The spacing of 6 ticks can be based on, for example, a maximum tick time error of 20%. This maximum tick time error can be based on various factors, such as temperature and supply voltage dependencies of a resistance-capacitance (RC) oscillator being used by the sensors. Other spacing can be possible, depending on a desired implementation and design constraints of the components within the system 100. Also, the spacing between the tick positions that can be used for encoding the sensor IDs can alter the number of sensors that can be connected to the ECU 102 since the synchronization nibble in a SENT message, regardless of the SENT format, is fixed at 56 ticks.

Figure 4:
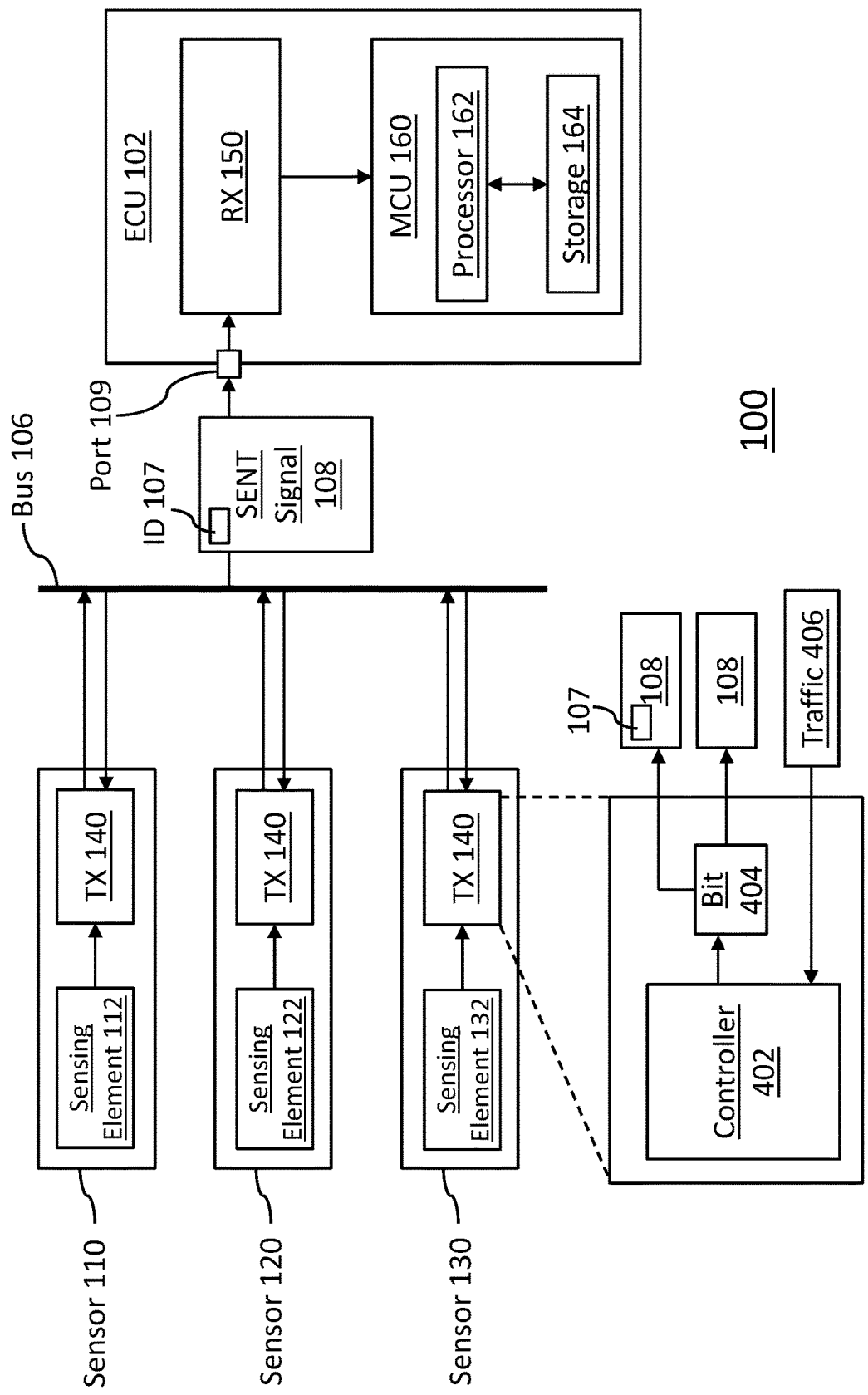
FIG. 4 is a diagram showing an example initialization of the system of FIG. 1 to implement multi-transmission mode in single edge nibble transmission (SENT) in one embodiment.

FIG. 4 is a diagram showing an example initialization of the system of FIG. 1 to implement multi-transmission mode in single edge nibble transmission (SENT) in one embodiment. In order to allow the multiple sensors connected to the port 109 to transmit data to the ECU 102 in an orderly manner, the TX module 140 in each sensor can be configured to perform an initialization process. The initialization process can be performed, by the TX module 140 of each sensor, in response to a power on of the system 100, or in response to a reset signal being outputted by one of the connected sensors or the ECU 102. The initialization process can include obtaining the number of sensors connected to the ECU 102, and the addresses of connected sensors. For example, the TX module 140 can include a controller 402 configured to listen to traffic 406 on the sensor bus 106 in order to obtain information such as a number of sensors connected to the sensor bus 106 and the addresses of the connected sensors.

In the initialization process, the TX module 140 of each sensor among sensors 110, 120, 130 can listen to traffic 406 on the sensor bus 106. In an example, the traffic 406 can include structure frames of SENT signals being transmitted on the sensor bus 106. If the multiple SENT signals have synchronization nibbles with the same tick position to start a low-to-high transition, then the controller 402 can determine that there is one sensor connected to the sensor bus 106 and can decode one of the synchronization nibbles of the multiple sensor signals to extract the ID of the connected sensor. If the multiple SENT signals are two SENT signals having synchronization nibbles with low-to-high transition starting at two different tick positions, then the traffic 406 can indicate there are two sensors assigned to transmission positions and the controller 402 can decode the synchronization nibbles to extract the IDs of the two connected sensors. If there is no SENT signal on the sensor bus 106 (according to the traffic 406), then the TX module 140 may wait for an amount of time (e.g., a number of time cycles) before transmitting a SENT signal to the sensor bus 106. For example, if the TX module 140 for the sensor 120 (assigned to ID #1) listens to traffic 406 and see no SENT signal on the sensor bus, then the sensor 120 may wait for one time cycle before transmitting its own SENT signal with the tick position representing ID #1 in its synchronization nibble. If the TX module for a sensor is assigned to ID #6, and the traffic 406 indicates no SENT signal was transmitted on the sensor bus, then this sensor may wait for five time cycles before transmitting its own SENT signal with the tick position representing ID #6 in its synchronization nibble. In some examples, the TX module 140 on each sensor can encode a reset signal in the R tick position (shown in FIG. 3) instead of its ID in the synchronization nibble. The traffic 406 can be updated with an indication of the reset signal being detected in one of the signals on the sensor bus 106, and the TX module 140 of all sensors can begin the initialization process once again.

The controller 402 can be further configured to activate or deactivate a multi-transmission mode by controller a configuration bit 404. The configuration bit 404 can be, for example, a hardware switching element, a parameter that can be defined using software, a value stored in a register, or a bit configured in non-volatile memory (NVM) of the sensor, depending on a design and implementation of the system 100 and the TX module 140. The configuration bit 404 can have two values, such as binary 0 and binary 1. In an example, the configuration bit 404 being binary 0 (or binary 1) can denote a deactivation of the multi-transmission mode, and the configuration bit 404 being binary 1 (or binary 0) can denote an activation of the multi-transmission mode. The activation of the multi-transmission mode can cause the TX module 140 to encode the ID 107 in the SENT signal 108 to facilitate transmission from multiple sensors to the ECU. The deactivation of the multi-transmission mode can allow the TX module 140 to function as a normal SENT interface without encoding the sensor ID in the SENT signal 108. Therefore, the TX module 140 can be compatible with existing systems that uses the SENT protocol without sensor ID encoding.

In response to a completion of the initialization process, operation of the system 100 in multi-transmission mode can commence by having the sensors transmit their own SENT signals under the assigned transmission positions. In an example, the TX module 140 can continue to listen to the traffic 406 in order to determine whether it is the appropriate time to transmit a signal. In an example, an order of transmission for the multiple sensors can be predefined. For example, the NVM of each one of the three sensors 110, 120, 130 shown in FIG. 4 can store instructions or rules indicating a respective transmission ID. The stored transmission IDs can represent transmission positions within a transmission order. For example, the sensor 110 may store the transmission ID #0, the sensor 120 may store the transmission ID #1, and the sensor 130 may store the transmission ID #2.

To perform transmission under the multi-transmission mode, the controller 402 can use traffic 406 to determine whether a corresponding sensor shall transmit its SENT signal to the sensor bus 106, or to wait for its turn to transmit. For example, the TX module 140 can obtain traffic 406 including a frame structure and/or a synchronization nibble of a most recent SENT signal on the sensor bus. The TX module 140 can decode the synchronization nibble in the traffic 406 to identify or extract an encoded ID of a sensor that transmitted the most recent SENT signal. If the most recent SENT signal is transmitted by the sensor 130, then the TX module 140 of the sensor 110 can determine that sensor 110 can perform a SENT signal transmission to the sensor bus 106 based on the transmission order (e.g., #0, #1, #2, #0, #1, etc.) and transmission positions (e.g., sensor 110 being assigned to #0 and sensor 130 being assigned to #2) stored in the sensor 110. If the most recent SENT signal is transmitted by the sensor 130, then the TX module 140 of the sensor 120 can determine that sensor 120 is prohibited to perform a SENT signal transmission to the sensor bus 106 based on the transmission order (e.g., #0, #1, #2, #0, #1, etc.) and transmission positions (e.g., sensor 120 being assigned to #1 and sensor 130 being assigned to #2) stored in the sensor 110. Thus, the ECU 102 can receive SENT signals in an orderly manner and conflicting traffic on the sensor bus 106 can be avoided.

In another example, the sensors 110, 120, 130 can be configured to transmit SENT signals in an order of ID #1, #3, #4, respectively. Thus, the sensor 120 may wait for the ID #1 to appear in the traffic 406 to transmit its SENT signal, the sensor 130 may wait for the ID #3 to appear in the traffic 406 to transmit its SENT signal, and the sensor 110 may wait for the ID #4 to appear in the traffic 406 to transmit its SENT signal. If an error occurs, such as the traffic 406 showing a transmission order of #1, #2, then the sensor 130 may start a wait event to wait for an amount of time before sending its SENT signal because the traffic 406 does not show ID #3. For example, a time between each transmission of SENT signal from different sensors is T. In response to the traffic 406 showing the most recent transmission was from ID #2, the sensor 130 may wait for, for example, a time of T to ensure that there may be ample time for the sensor device with ID #3 to transmit a SENT signal before sensor 130 performs a transmission. The ECU 102 may also be aware of the wait time T. If the ECU 102 does not receive SENT signals from a sensor after the wait time T, or detects that the sensor waits for the wait time T on numerous occasions (e.g., for N iterations of the sequence #1, #3, #4), then the ECU 102 can put (e.g., send, broadcast) a reset request on the sensor bus 106. In other words, the ECU 102 can detect whether there is a potential error based on an order in which SENT signals are being received, and also based on the timings in which the SENT signals are being received. The traffic 406 can indicate the reset request, and the sensors 110, 120, 130 can listen to the traffic 406 and detect the reset request, and reset the initialization process with the ECU 102

By encoding a sensor ID in the synchronization nibble of a SENT message, multiple sensors can be connected to a single ECU without the need to add additional ports and hardware that can occupy device space and increase device size. Further, due to the synchronization nibble is typically being used for synchronization purposes only, and does not include any data or information, the tick positions between a start tick and an ending tick of a calibration pulse (CP) in the synchronization nibble can be used for decoding the sensor IDs. The utilization of the synchronization nibble allows ID coding without adding ticks or nibbles to the SENT protocol, and without affecting any data or information being carried by the SENT signal. Furthermore, the encoding being performed by the transmitter, and the decoding being performed by the receiver, can be realized with relatively simple modifications to hardware, software, or firmware, without impacting normal operations of the system 100. Also, by having each sensor encoding its ID in each SENT message being transmitted, no additional communication before or after sending the SENT message is needed between the transmitter and the receiver.

Figure 5:
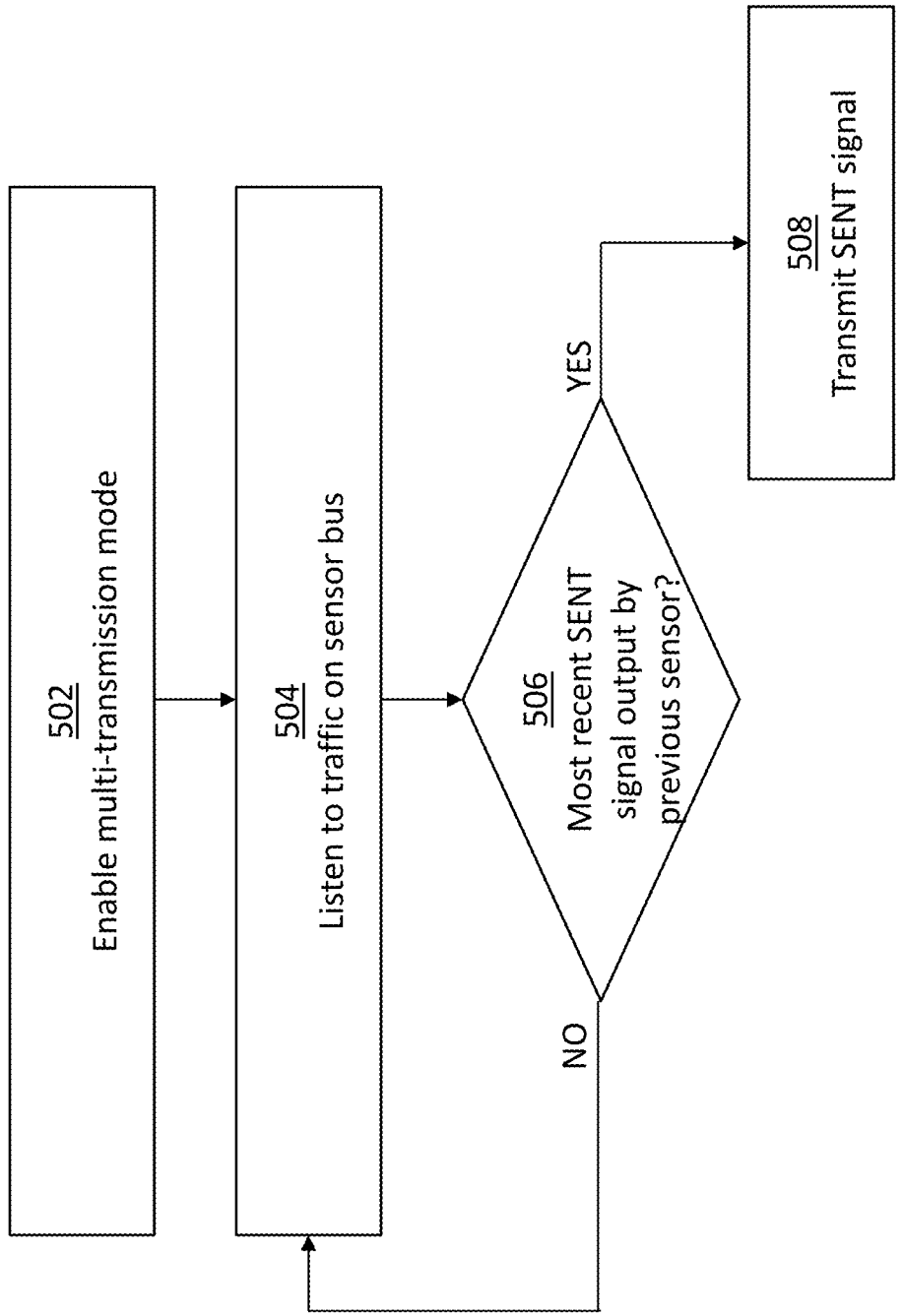
FIG. 5 is a flow diagram illustrating a process 500 to implement multi-transmission mode in single edge nibble transmission (SENT) in one embodiment.

FIG. 5 is a flow diagram illustrating a process 500 to implement multi-transmission mode in single edge nibble transmission (SENT) in one embodiment. The process can include one or more operations, actions, or functions as illustrated by one or more of blocks 502, 504, 506, and/or 508. Although illustrated as discrete blocks, various blocks can be divided into additional blocks, combined into fewer blocks, eliminated, or performed in parallel, depending on the desired implementation.

The process 500 can be implemented by a transmitting device in a system implement the SENT communication protocol. The system can include a receiving device connected to one or more transmitting devices (including the transmitting device performing the process 500) via a sensor bus. The transmitting device can be a part of a sensor that includes sensing elements, memory devices, and processing elements. The receiving device can be a part of an electronic control unit including memory devices and processing units such as microcontrollers.

The process 500 can begin at block 502. At block 502, the transmitting device can enable a multi-transmission mode. In an example, the transmitting device can enable the multi-transmission mode by setting a configuration bit stored in the transmitting device. The multi-transmission mode can allow more than one transmitting devices in the system to connect, and to transmit SENT signals, to the receiving device. The process 500 can proceed from block 502 to block 504. At block 504, under the multi-transmission mode, the transmitting device can listen to traffic on the sensor bus. The traffic obtainable by the transmitting device can include, for example, frame structure of SENT signals being transmitted to the receiving device via the sensor bus.

The process 500 can proceed from block 504 to block 506. At block 506, the transmitting device can use the traffic obtained from block 504 to determine whether a most recent SENT signal on the sensor bus is outputted by another sensor assigned as a previous sensor in a transmission order or sequence. For example, the system can include three sensors assigned to transmission positions #0, #1, #2. A transmission order for the three sensors to transmit SENT signals can be a predefined order #0, #1, #2, #0, #1, #2, etc. In an example, the transmitting device performing the process 500 can be assigned to transmission position #2. In response to the most recent SENT signal on the sensor bus being outputted by a sensor assigned to #0, the process 500 can return to block 504, where the transmitting device may continue to listen to traffic on the sensor bus. In response to the most recent SENT signal on the sensor bus being outputted by a sensor assigned to #1, the process 500 can proceed to block 508, where the transmitting device may transmit its SENT signal to the receiving device via the sensor bus.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
a controller configured to encode an identifier of a device in a synchronization nibble of a single edge nibble transmission (SENT) signal by modifying a width of a calibration pulse in the synchronization nibble, wherein the SENT signal is being outputted by the device, and the synchronization nibble precedes a status or communication nibble in message frame of the SENT signal.

2. The apparatus of claim 1, wherein to encode the identifier, the controller is configured to set a tick position in the synchronization nibble to start a transition from a logic low state to a logic high state.

3. The apparatus of claim 1, wherein the controller is further configured to encode the identifier of the device in a cyclic redundancy check (CRC) nibble of the SENT signal.

4. The apparatus of claim 1, wherein the controller is further configured to encode the identifier of the device in a data nibble of the SENT signal.

5. The apparatus of claim 1, wherein the controller is configured to output the SENT signal with the encoded identifier to an electronic control unit (ECU), and the device and the ECU are parts of a vehicular sensor system.

6. The apparatus of claim 1, wherein the controller is configured to:
listen to traffic on a communication bus;
in response to the traffic indicating the device is permitted to transmit the SENT signal to another device, output the SENT signal to the communication bus; and
in response to the traffic indicating the device is prohibited from transmitting the SENT signal to another device, continue to listen to the traffic on the communication bus.

7. The apparatus of claim 6, wherein the device is connected to the communication bus, and the controller is configured to detect a reset request in traffic on the communication bus, and encode a reset signal in the synchronization nibble to start a reset process to determine a number of devices connected to the communication bus and to determine identifiers of the number of devices.

8. An apparatus comprising:
a controller configured to:
receive a single edge nibble transmission (SENT) signal from a device; and
decode an identifier of the device based on a width of a calibration pulse in a synchronization nibble of the received SENT signal to identify the device, wherein the synchronization nibble precedes a status or communication nibble in message frame of the SENT signal.

9. The apparatus of claim 8, wherein to decode the identifier, the controller is configured to identify a tick position in the synchronization nibble of the SENT signal, wherein the tick position is a starting position of a transition from a logic low state to a logic high state of the synchronization nibble.

10. The apparatus of claim 8, wherein the identifier is further encoded in a cyclic redundancy check (CRC) nibble of the SENT signal.

11. The apparatus of claim 8, wherein the identifier is further encoded in a data nibble of the SENT signal.

12. The apparatus of claim 8, wherein the controller is part of an electronic control unit (ECU), and the device and the ECU are parts of a vehicular sensor system.

13. A system comprising:
a receiver; and
a transmitter connected to the receiver, the transmitter being configured to:
encode an identifier of a device in a synchronization nibble of a single edge nibble transmission (SENT) signal by modifying a width of a calibration pulse in the synchronization nibble, wherein the transmitter is in the device, wherein the synchronization nibble precedes a status or communication nibble in message frame of the SENT signal; and
transmit the SENT signal with the encoded identifier to the receiver;
the receiver being configured to:
receive the SENT signal transmitted from the transmitter; and
decode the identifier of the device based on a width of a calibration pulse in the synchronization nibble of the SENT signal to identify the device.

14. The system of claim 13, wherein to encode the identifier, the transmitter is configured to set a tick position in the synchronization nibble to start a transition from a logic low state to a logic high state of the synchronization nibble of the SENT signal.

15. The system of claim 13, wherein to decode the identifier, the receiver is configured to identify a tick position in the synchronization nibble of the SENT signal, wherein the tick position is a starting position of a transition from a logic low state to a logic high state of the synchronization nibble of the SENT signal.

16. The system of claim 13, wherein the transmitter is further configured to encode the identifier in a cyclic redundancy check (CRC) nibble of the SENT signal.

17. The system of claim 13, wherein the transmitter is further configured to encode the identifier of the device in a data nibble of the SENT signal.

18. The system of claim 13, wherein the transmitter is a part of the device, and the receiver is a part of an electronic control unit (ECU), and the device and the ECU are parts of a vehicular sensor system.

19. The system of claim 13, wherein the transmitter is configured to:
- listen to traffic on a communication bus; and
- in response to the traffic indicating the device is permitted to transmit the SENT signal to another device, output the SENT signal to the communication bus; and
- in response to the traffic indicating the device is prohibited from transmitting the SENT signal to another device, continue to listen to the traffic on the communication bus.

20. The system of claim 19, wherein the transmitter is connected to the communication bus, and the transmitter is configured to detect a reset request in traffic on the communication bus, and encode a reset signal in the synchronization nibble to start a process to determine a number of transmitters connected to the communication bus and to determine identifiers of the number of transmitters.

* * * * *